(12) United States Patent
Kano et al.

(10) Patent No.: US 7,994,076 B2
(45) Date of Patent: *Aug. 9, 2011

(54) FABRIC FOR AIRBAG

(75) Inventors: Kenichiro Kano, Osaka (JP); Takashi Tsuruta, Shiga (JP); Hideo Isoda, Shiga (JP); Hiroaki Hagiwara, Fukui (JP); Gaku Maruyama, Fukui (JP); Takahiro Hattori, Fukui (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/746,389

(22) PCT Filed: Oct. 16, 2008

(86) PCT No.: PCT/JP2008/068725
§ 371 (c)(1),
(2), (4) Date: Jun. 4, 2010

(87) PCT Pub. No.: WO2009/072353
PCT Pub. Date: Jun. 11, 2009

(65) Prior Publication Data
US 2010/0282358 A1 Nov. 11, 2010

(30) Foreign Application Priority Data
Dec. 7, 2007 (JP) ................. 2007-316507
Jul. 11, 2008 (JP) ................. 2008-181104

(51) Int. Cl.
*B32B 27/34* (2006.01)
(52) U.S. Cl. .................. 442/158; 280/728.1
(58) Field of Classification Search .......... 280/728.1; 442/76, 158
See application file for complete search history.

(56) References Cited

U.S. PATENT DOCUMENTS

| 4,356,300 A | 10/1982 | Isler et al. |
| 2003/0060103 A1 | 3/2003 | Nagaoka et al. |
| 2007/0031621 A1 | 2/2007 | Morimoto |
| 2010/0260976 A1 | 10/2010 | Kano et al. |

FOREIGN PATENT DOCUMENTS

| JP | 55-133424 | 10/1980 |
| JP | 59-133224 | 7/1984 |
| JP | 04-281062 | 10/1992 |
| JP | 05-016753 | 1/1993 |
| JP | 11-222776 | 8/1999 |
| JP | 2001-89949 | 4/2001 |
| JP | 2001-524624 | 12/2001 |
| JP | 2006-249655 | 9/2006 |
| WO | WO 99/28121 | 6/1999 |

OTHER PUBLICATIONS

Office action in U.S. Appl. No. 12/746,384, mailed Oct. 8, 2010.
Office action, dated Oct. 8, 2010, in U.S. Appl. No. 12/746,384.
U.S. Appl. No. 12/746,384, filed Jun. 4, 2010.

*Primary Examiner* — Arti Singh-Pandey
(74) *Attorney, Agent, or Firm* — Fish & Richardson P.C.

(57) ABSTRACT

A fabric for an airbag includes a synthetic fiber woven fabric in which at least one side thereof is coated with a synthetic resin. A range of 0.1 to 10 g/m² of the synthetic resin is adhered to the synthetic fiber woven fabric having a cover factor of less than 2000 and a FR value of 55% or more. Air permeability of the fabric under a pressure difference of 100 kPa after adhesion is 0.01 to 1.00 L/cm²/min. The synthetic resin can be a polyamide-based resin having a soft segment comprising a polyol with a number average molecular weight of 100 to 5000.

7 Claims, No Drawings

FABRIC FOR AIRBAG

TECHNICAL FIELD

The present invention relates to a fabric for an airbag which is of the low cost, and excellent in accommodability, and has air permeability satisfying a human body initial constraining performance.

BACKGROUND ART

An airbag, a wearing rate of which has been rapidly increased in recent years as one of automobile safety parts, is such that upon an automobile collision accident, a sensor senses impact, an inflator generates a gas at a high temperature and a high pressure, this gas rapidly develops an airbag, thereby, upon flying of a driver and a passenger in a collision direction, particularly a head is prevented or protected from colliding against a handle, a front glass or a door glass. Previously, in the airbag, a coated woven fabric covered with a synthetic rubber such as chloroprene, chlorosulfonated olefin and silicone has been used because of high heat resistance, high air insulating property (low air permeability), and high flame-retardancy and, currently, a silicone-coated woven fabric has become the mainstream.

However, since a woven fabric coated with these synthetic rubbers is increased in a mass of a woven fabric, is not satisfactory in flexibility, and is of the high manufacturing cost, it has many disadvantages for use in a woven fabric for an airbag.

It has been previously known that a woven fabric is improved by a coating amount of a woven fabric (see Patent Literature 1). However, there is no description in connection with airbag development performance in Patent Literature 1. Further, air permeability is not at a satisfactory level, and improvement is sought.

In addition, for the purpose of reduction in a weight, and cost saving, an invention of coating a woven fabric with a crosslinking elastomer is provided (see e.g., Patent Literature 2). However, an adhesion amount is high in embodiments in Patent Literature 2, and further reduction in a weight is sought.

On the other hand, in an airbag for head-on collision, an airbag using a non-coated woven fabric which is light, is excellent in accommodability, and is not coated has become the mainstream (see e.g., Patent Literature 3). However, in an airbag which is of a small distance from a passenger, such as an airbag for a side collision, higher speed development performance is necessary and, for this reason, a woven fabric for an airbag withstanding a high pressure inflator is sought.

Currently, as a woven fabric for an airbag which can maintain lightness, and better accommodability, being properties of a non-coated woven fabric, impregnation treatment with a synthetic resin diluent is proposed (see e.g., Patent Literature 4). However, air permeability of the woven fabric for an airbag obtained by this method is not sufficiently satisfactory.

Patent Literature 1: JP-A 5-016753
Patent Literature 2: JP-A 2001-524624
Patent Literature 3: JP-A 4-281062
Patent Literature 4: JP-A 11-222776

DISCLOSURE OF THE INVENTION

Problems to be Solved by the Invention

In view of the circumstances of the Background Art, an object of the present invention is to provide a fabric for an airbag, which is of the low cost, is excellent in accommodability, and has air permeability satisfying human body initial constraining performance.

Means to Solve the Problems

In order to attain the object, the present invention has the following features.

(1) A fabric for an airbag comprising a synthetic fiber woven fabric in which at least one side thereof is coated with a synthetic resin, characterized in that a range of 0.1 to 10 g/m² of synthetic resin is adhered to a synthetic fiber woven fabric having a cover factor represented by the equation 1 of less than 2000 and FR represented by the equation 2 of 55% or more, and air permeability of the fabric under a pressure difference of 100 kPa after adhesion is 1.00 L/cm²/min or less.

$$\text{Cover factor} = \left[\frac{\text{warp density (number/2.54 cm)} \times}{\sqrt{\text{(warp fineness }(dtex) \times 0.9)}}\right] + \left[\frac{\text{weft density (number/2.54 cm)} \times}{\sqrt{\text{(weft fineness }(dtex) \times 0.9)}}\right] \quad \text{(equation 1)}$$

$$FR(\%) = W/(\rho \times T \times 10) \quad \text{(equation 2)}$$

W: woven fabric mass (g/cm²), ρ: fiber specific gravity: (g/cm³), T: woven fabric thickness (mm)

(2) The fabric for an airbag according to (1), wherein the synthetic resin comprises at least a thermoplastic elastomer and two kinds of thickeners, and a ratio of the thickener among an adhesion amount of the synthetic resin in the fabric after drying is 30% by mass or less.

(3) The fabric for an airbag according to (2), wherein the thermoplastic elastomer is a polyamide-based elastomer.

(4) The fabric for an airbag according to (3), wherein the polyamide-based elastomer is a polyether polyamide copolymer composed of a soft segment and a hard segment, the soft segment consists of polyether polyamide composed of a polyether diamine compound represented by the following general formula (I) and a dicarboxylic acid compound represented by the following general formula (II), and the hard segment consists of polyamide composed of an aminocarboxylic acid compound represented by the following general formula (III), and/or a lactam compound represented by the following general formula (IV).

[Chemical formula 1]

[wherein R represents a straight or branched alkylene group of a carbon number of 2 to 3, and n represents a numerical value of 13 to 26]

[Chemical formula 2]

[wherein R¹ represents a tethering group comprising a hydrocarbon chain]

[Chemical formula 3]

[wherein R² represents a tethering group comprising a hydrocarbon chain]

[Chemical formula 4]

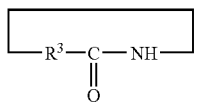

(IV)

[wherein R³ represents a tethering group comprising a hydrocarbon chain]
(5) The fabric for an airbag according to any one of (2) to (4), wherein the thickener is a cellulose-based derivative.

Effect of the Invention

The fabric for an airbag of the present invention, even in the case of a low cover factor, by using a woven fabric having a FR value of the equation 2 of 55% or more, is of the low cost, is excellent in accommodability, and can have air permeability satisfying the initial of a human body constraining performance.

BEST MODE FOR CARRYING OUT THE INVENTION

The present invention will be explained in detail below.

The synthetic fiber used in the present invention is not particularly limited in a material, but aliphatic polyamide fibers such as nylon 66, nylon 6, nylon 46, nylon and the like, aromatic polyamide fibers such as an aramide fiber, and polyester fibers such as polyethylene terephthalate, polytrimethylene terephthalate and polybutylene terephthalate are used. Other examples include wholly aromatic polyester fibers, ultrahigh molecular weight polyethylene fibers, polyparaphenylene/benzobisoxazole fibers (PBO fiber), polyphenylene sulfide fibers, polyether ketone fibers and the like. In view of economy, polyester fibers and polyamide fibers are particularly preferable.

As these fibers, a part or all of them may be obtained from a used raw material. In addition, it is not problematic at all that these synthetic fibers contain various additives in order to improve step passage property at an original yarn production step and a post-possessing step. Examples of additives include antioxidants, thermal stabilizers, smoothing agents, antistatic agents, viscosity increasing agents, flame-retardants and the like. In addition, it is not problematic at all that these synthetic fibers are a colored original yarn, or are dyed after yarn-making. In addition, a cross section of a single yarn of the synthetic fiber may be of a modified cross-section in addition to a conventional circular cross section without any problem. It is preferable that the synthetic fiber is used as a multifilament yarn and woven into a fabric from a viewpoint of a breakage strength, a breakage elongation or the like.

In the present invention, a method of weaving a fabric is not particularly limited, but plain weaving is good in view of uniformity of physical property of a woven fabric. As a yarn, a wrap and a weft may not be single or not, and may be different, for example, in a thickness, the number, and a fiber kind of yarns. It is necessary that a cover factor of a woven fabric is less than 2000, preferably 1500 or more. More preferably, the cover factor is 1600 to 1900. When the cover factor is 2000 or more, rigidity of a fabric itself is increased, and accommodability is deteriorated, thus, this is not preferable.

When the cover factor is less than 1500, a necessary amount of a resin for obtaining necessary air permeability is increased, and accommodability is deteriorated. The cover factor can be calculated by the following equation 1.

$$\text{Cover factor} = \left[ \begin{array}{c} \text{warp density (number/2.54 cm)} \times \\ \sqrt{\text{(warp fineness } (dtex) \times 0.9)} \end{array} \right] + \left[ \begin{array}{c} \text{weft density (number/2.54 cm)} \times \\ \sqrt{\text{(weft fineness } (dtex) \times 0.9)} \end{array} \right] \quad \text{(equation 1)}$$

The woven fabric in the present invention can be produced by coating a synthetic resin on at least one side of a synthetic fiber woven fabric made by the known method. The coating method is not particularly limited, but the known method can be used and, in view of the cost and flexibility of the woven fabric after coating, it is preferable to use knife coating.

In the present invention, as a synthetic resin to be coated on a woven fabric, a polyurethane-based resin, an acryl-based resin, a polyester-based resin, and a polyamide-based resin can be used and, among them, a polyamide-based resin having a soft segment comprising an amino-modified polyol having a number average molecular weight of 100 to 5000 is preferable from a viewpoint of air permeability. A more preferable molecular weight of a polyol is 300 to 3000. When a molecular weight is less than 100, since a tearing strength is reduced, this is not preferable. When a molecular weight is more than 5000, since a sliding resistance force is easily deficient, this is not preferable. Measurement of a number average molecular weight was performed as follows:
GPC Method
Apparatus: TOSOH HLC-8330GPC
Column: TSKgel SuperHM-H×3+TSKgel SuperH2000 (TOSOH)
Solvent: HFIP/sodium trifluoroacetate 10 mM
Flow rate: 0.25 ml/min Concentration: 0.05%
Temperature: 40° C., detector: RI
A molecular weight was calculated in terms of standard polymethyl methacrylate.

Herein, the soft segment refers to a whole polyol, and amino-modified linear polyalkylene glycol is preferable from a viewpoint of performance of the thermoplastic resin. More preferable is polyethylene glycol, polypropylene glycol, polytetramethylene glycol or polybutylene glycol, each being amino-modified. An amount of the soft segment is 10 to 90% by mass in terms of a mass ratio in a polymer. When the ratio is less than 10% by mass, flexibility of a woven fabric after coating is lost, being not preferable. When the ratio exceeds 90% by mass, a nature as an elastomer is not obtained, and air permeability is increased, being not preferable.

In the present invention, a melting point of a synthetic resin to be coated on a woven fabric is in a range of preferably 120 to 180° C., more preferably 125 to 160° C., further preferably 130 to 145° C. In a woven fabric for an airbag in which at least one side is coated with the synthetic resin, in order to improve heat aging resistance, it is preferable that a melting point of the synthetic resin is 120° C. or higher. In addition, in order to improve dispersibility is water of the synthetic resin, a melting point is preferably 180° C. or lower, further preferably 150° C. or lower.

As the synthetic resin, the polyetherdiamine compound of the general formula (I), the dicarboxylic acid compound of the general formula (II), and a polyamide forming monomer, that is, a polyether polyamide copolymer obtained by polymerizing the aminocarboxylic acid compound of the general formula (III) and/or the lactam compound of the general formula (IV) are preferable.

In addition, in the polyether polyamide copolymer, a ratio of a soft segment relative to a total amount of the resin is in a range of preferably 70 to 80% by mass, more preferably 73 to 83% by mass, further preferably 77 to 81% by mass.

By using the specified polyether polyamide copolymer, air permeability can be further reduced even in a coated fabric in which the same amount of a resin is coated on a woven fabric.

In the polyether polyamide copolymer resin, such a ratio is preferable that a terminal amino group, and a terminal carboxylic acid or carboxyl group contained in the polyetherdianime compound, the dicarboxylic acid compound, and the polyamide forming monomer are of approximately equal moles.

Particularly, when one terminus of the polyamide forming monomer is an amino group, and the other terminus is carboxylic acid or a carboxyl group, such a ratio is preferable that the polyetherdiamine compound and the dicarboxylic acid compound are such that an amino group of the polyetherdiamine compound and a carboxyl group of the dicarboxylic acid are of approximately equal moles.

Examples of the polyetherdiamine compound of the general formula (I) include polyoxyethylene, 1,2-polyoxypropylene, 1,3-polyoxypropylene and an amino-modified copolymer of them. In the general formula (I), R represents plural kinds of alkylene groups in some cases. And, n is a numerical value of 13 to 26.

As the polyetherdiamine compound of the general formula (I), a polyetherdiamine compound of the following general formula (V) is preferable. As an embodiment of the polyetherdiamine compound of the following formula (V), JEF-FAMINE ED900 ((x+z) is about 6.0 and y is about 12.5 in the general formula (V)) manufactured by HUNTSMAN, USA can be used.

[Chemical formula 5]

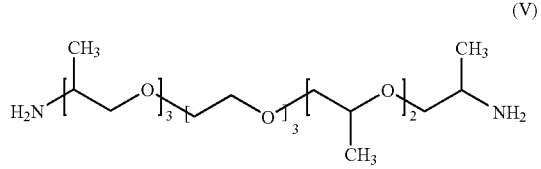

(V)

In the polyetherdiamine compound of the general formula (V), y is preferably 9.2 to 19.4, more preferably 11.0 to 16.7, further preferably 12.5 to 14.4. And, (x+z) is preferably 3.8 to 6.0, more preferably 5.0 to 6.0, further preferably 5.5 to 6.0.

A number average molecular weight of the polyetherdiamine compound of the formula (I) is in a range of preferably 700 to 1200, more preferably 800 to 1100, further preferably 900 to 1000.

As the dicarboxylic acid compound of the general formula (II), at least one kind dicarboxylic acid selected from aliphatic, alicyclic and aromatic dicarboxylic acids, or a derivative thereof can be used.

In the dicarboxylic acid of the general formula (II), $R^1$ is preferably a molecular chain of a hydrocarbon of a carbon number of 1 to 20, or an alkylene group of a carbon number of 1 to 20, further preferably a molecular chain of a hydrocarbon of a carbon number of 1 to 15, or an alkylene group of a carbon number of 1 to 15, more preferably a molecular chain of a hydrocarbon of a carbon number of 2 to 12, or an alkylene group of a carbon number of 2 to 12, particularly preferably a molecular chain of a hydrocarbon of a carbon number of 4 to 10, or an alkylene group of a carbon number of 4 to 10.

Examples of the dicarboxylic acid include aliphatic dicarboxylic acids such as straight aliphatic dicarboxylic acids such as oxalic acid, succinic acid, glutaric acid, adipic acid, pimelic acid, suberic acid, azelaic acid, sebacic acid and dodecanedioic acid, dimerized aliphatic dicarboxylic acids (dimer acid) of a c number of 14 to 48 obtained by dimerzing unsaturated fatty acid obtained by fractional distillation of triglyceride, and hydrogen adducts (hydrogenated dimer acid) of them, alicyclic dicarboxylic acids such as 1,4-cyclohexanedicarboxylic acid, and aromatic dicarboxylic acids such as terephthalic acid and isophtalic acid. As dimer acid and hydrogenated dimer acid, trade name "PRIPOL 1004", "PRIPOL 1006", "PRIPOL 1009" and "PRIPOL 1013" manufactured by Uniquema can be used.

Then, the aminocarboxylic acid compound of the general formula (III) and the lactam compound of the general formula (IV) will be explained.

In the aminocarboxylic acid compound of the general formula (III), $R^2$ is preferably a molecular chain of a hydrocarbon of a carbon number of 2 to 20, or an alkaline group of a carbon number of 2 to 20, further preferably a molecular chain of a hydrocarbon of a carbon number of 3 to 18, or an alkylene group of a carbon number of 3 to 18, more preferably a molecular chain of a hydrocarbon of a carbon number of 4 to 15, or an alkylene group of a carbon number of 4 to 15, particularly preferably a molecular chain of a hydrocarbon of a carbon number of 4 to 10, or an alkylene group of a carbon number of 4 to 10.

In the lactam compound of the general formula (IV), $R^3$ is preferably a molecular chain of a hydrocarbon of carbon number of 2 to 20, or an alkylene group of a carbon number of 2 to 20, further preferably a molecular chain of a hydrocarbon of a carbon number of 3 to 18, or an alkylene group of a carbon number of 3 to 18, more preferably a molecular chain of a hydrocarbon of a carbon number of 4 to 15, or an alkylene group of a carbon number of 4 to 15, particularly preferably a molecular chain of a hydrocarbon of a carbon number of 4 to 10, or alkylene group of a carbon number of 4 to 10.

As the aminocarboxylic acid compound and the lactam compound, at least one polyamide forming monomer including aliphatic, alicyclic and/or aromatic monomers, selected from ω-aminocarboxylic acid, lactam, those synthesized from diamine and dicarboxylic acid, and salts thereof are used.

In those synthesized from diamine and dicarboxylic acid and salts thereof, examples of diamine include at least one of a diamine compound selected from aliphatic diamine, alicyclic diamine and aromatic diamine, and derivatives thereof, and examples of dicarboxylic acid include at least one kind of a dicarboxylic compound selected from aliphatic dicarboxylic acid, alicyclic dicarboxylic acid, and aromatic dicarboxilic acid, and derivatives thereof.

A molar ratio of diamine and dicarboxylic acid (diamine/dicarboxylic acid) is in a range of preferably 0.9 to 1.1, further preferably 0.93 to 1.07, more preferably 0.95 to 1.05, particularly preferably 0.97 to 1.03. When the molar ratio is outside this range, it becomes difficult to increase a molecular weight in some cases.

Examples of the ω-aminocarboxylic acid include aliphatic ω-aminocarboxylic acids of a carbon number of 5 to 20, such as 6-aminocaproic acid, 7-aminoheptanoic acid, 8-aminooctanoic acid, 10-aminocapric acid, 11-aminoundecanoic acid, and 12-aminododecanoic acid.

Examples of the lactam include aliphatic lactams of a carbon number of 5 to 20, such as ε-caprolactam, ω-enantholactam, ω-undecalactam, ω-dodecalactam, and 2-pyrrolidone.

In those synthesized form diamine and dicarboxylic acid, and salts thereof, examples of the diamine include eThylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,2,4-trimethylhexamethylenediamine, and 3-methylpentamethylenediamine.

Examples of the dicarboxylic acid include dicarboxylic acids such as aliphatic dicarboxylic acids of a carbon number of 2 to 20 such as oxalic acid, succinic acid, adipic acid, pimelic acid, suberic acid, azelaic acid, sebacic acid and dodecanedioic acid.

The polyether polyamide copolymer resin can be produced by the known condensation reaction.

In production of the polyether polyamide copolymer resin, if necessary, phosphoric acid compounds such as phosphoric acid, pyrophosphoric acid and polyphosphoric acid, phosphinic acid compounds such as dimethylphosphinic acid, phenylmethylphosphinic acid, hypophosphorous acid, sodium hypophosphite, and ethyl hypophosphite, sodium phenyl hypophosphite, and ethyl phenylhypophosphite, phosphonous acid compounds such as phenylphosphonous acid, sodium phenylphosphonite, and ethyl phenylphosphonite, phosphonic acid compounds such as phenylphosphonic acid, ethylphosphonic acid, sodium phenylplosphonate, diethyl phenylphosphonate, and sodium ethylphosphonate, and phosphorous acid compounds such as phosphorous acid, sodium hydrogen phosphite, sodium phosphite, triethyl phosphite, triphenyl phosphite, and pyrophosphorous acid can be added as a catalyst.

And, in order to impart various functions, additives such as antioxidants, light stabilizers, ultraviolet absorbing agents, thickeners, coloring agents, crosslinking agents, degradation preventing agents, inorganic fillers, heat resisting agents, antistatic agents, lubricants, slip agents, crystal nucleating agents, adherability imparting agents, sealability improving agents, anti-fogging agents, releasing agents, plasticizers, pigments, dyes, perfumes, flame-retardants, reinforcing agents, metal inactivating agents, neutralizing agents, antacids, antibacterial agents, fluorescent brighteners, fillers and the like may be mixed into the synthetic resins to be adhered to the fabric for an airbag, in such a range that the objective performance of the present invention is not affected.

The antioxidant can capture and degrade a peroxy radical and hydroperoxide which are a main factor for thermal oxidation degradation, and can suppress weakening of the resin. Furthermore, the antioxidant in an additive which exhibits remarkable function of preventing light degradation when used with the light stabilizer. As a representative antioxidant, there are a hindered phenol-based antioxidant, a sulfur-based antioxidant, a phosphorus-base antioxidant, and an amine-base antioxidant.

Examples of the hindered phenol-based antioxidant include 3,5-di-t-butyl-4-hydroxytoluene, n-octadecyl-β-(4'-hydroxy-3',5'-di-t-butylphenyl)propionate, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, calcium (3,5-di-t-butyl-4-hydroxybenzyl-monoethyl-phosphate), triethylene glycol bis[3-(3-t-butyl-5-methyl-4-hydroxyphenyl)propionate], pentaerythrityl-tetrakis[3-(3,5-di-t-butylanilino)-1,3,5-triazine, 3,9-bis[1,1-dimethyl-2-{(β-(3-t-butyl-4-hydroxy-5-methylphenyl)propionyloxy}ethyl]2,4,8,10-tetraoxaspiro[5,5]undecane, bis[3,3-bis(4'-hydroxy-3'-t-butylphenyl)butyric acid]glycol ester, triphenol, 2,2'-ethylidenebis(4,6-di-t-butylphenol), N,N'-bis[3-(3,5-di-t-butyl-4-hydroxyphenyl)propionyl]hydrazine, 2,2'-oxamidebis[ethyl-3-(3,5-di-t-butyl-4-hydroxyphenyl)propionate], 1,1,3-tris(3',5'-di-t-butyl-4'-hydroxybenzyl)-S-triazine-2,4,6(1H,3H,5H)-trione, 1,3,5-tris(4-t-butyl-3-hydroxy-2,6-dimethylbenzyl)isocyanurate, 3,5-di-t-butyl-4-hydroxyhydrocinnamic acid triesterwith-1, 3,5-tris(2-hydroxyethyl)-S-triazine-2,4,6(1H,3H,5H), N,N'-hexamethylenebis(3,5-di-t-butyl-4-hydroxyhydrocinnamide), 3,9-bis[2-[3-(3-t-butyl-4-hydroxy-5-methylphenyl) propionyloxy]-1,1-dimethylethyl]-2,4,8,10-tetraoxaspiro[5, 5]undecane and the like.

Examples of the sulfur-based antioxidant include dilauryl-3,3'-thiodipropionic acid ester, dimyristyl-3,3'-thiodipropionic acid ester, distearyl-3,3'-thiodipropionic acid ester, laurylstearyl-3,3'-thiodipropionic acid ester, dilaurylthiodipropionate, dioctadecyl sulfide, pentaerythritol-tetra(β-lauryl-thiopropionate) ester and the like.

Examples of the phosphorus-based antioxidant include tris (mixed, mono and dinolylphenyl) phosphite, tris(2,3-di-t-butylphenyl) phosphite, 4,4'-butylidene-bis(3-methyl-6-t-butylphenyl-di-tridecyl) phosphite, 1,1,3-tris(2-methyl-4-di-tridecylphosphite-5-t-butylphenyl)butane, tris(2,4-di-t-butylphenyl) phosphite, bis(2,4-di-t-butylphenyl) pentaerythritol-di-phosphite, tetrakis(2,4-di-t-butylphenyl)-4,4'-biphenylene phosphanite, bis(2,6-di-t-butyl-4-methylphenyl)pentaerythritol-di-phosphite, tetrakis(2,4-di-t-butylphenyl)-4,4'-biphenylene-di-phosphonite, triphenyl phosphite, diphenyldecyl phosphite, tridecyl phosphite, trioctyl phosphite, tridodecyl phosphite, trioctadecyl phosphite, trinonylphenyl phosphite, tridodecyltrithio phosphite and the like.

Examples of the amine-based antioxidant include amines such as N,N-diphenylethylenediamine, N,N-diphenylacetamidine, N,N-diphenylformamidine, N-phenylpiperidine, dibenzylethylenediamine, triethanolamine, phenothiazine, N,N'-di-sec-butyl p-phenylenediamine, 4,4'-tetramethyl-diaminodiphenylmethane, P,P'-dioctyl-diphenylamine, N,N'-bis(1,4-dimethyl-pentyl)-p-phenylenediamine, phenyl-α-naphthylamine, phenyl-β-naphthylamine, 4,4'-bis(4-α,α-dimethylbenzyl)diphenylamine and the like, derivatives thereof, reaction products of amines and aldehydes, and reaction products of amines and ketones.

As the light stabilizer, there are ultraviolet absorbing agents (UVA) which convert light energy into harmless heat energy, and hindered amine-based light stabilizers (HALS) which capture radicals generated by photooxidation.

Examples of the hindered amine-based light stabilizer include a polycondensate of dimethyl succinate and 1-(2-hydroxyethyl)-4-hydroxy-2,2,6,6-tetramethylpiperodine, poly[[6-(1,1,3,3-tetrabutyl)imino-1,3,5-triazine-2,4-diyl] hexamethylene[(2,2,6,6-tetramethyl-4-piperidyl)imyl]], bis (1,2,2,6,6-pentamethyl-4-piperidyl) ester of 2-n-butylmalonic acid, tetrakis(2,2,6,6-tetramethyl-4-piperidyl)-1,2,3,4-butanetetracarboxylate, bis(2,2,6,6-tetramethyl-4-piperidyl) sebacate, a polycondensate of N,N'-bis(2,2,6,6-tetramethyl-4-piperidyl)hexamethylenediamine and 1,2-dibromoethane, poly[(N,N'-bis(2,2,6,6-tetramethyl-4-piperidyl)hexamethylenediamine)-(4-monopholino-1,3,5-triazine-2,6-diyl)-bis(3, 3,5,5-tetramethylpiperazinone)], tris(2,2,6,6-tetramethyl-4-piperidyl)-dodecyl-1,2,3,4-tris(1,2,2,6,6-pentamethyl-4-piperidyl)-dodecyl-1,2,3,4-butanetetracarboxylate, bis(1,2, 2,6,6-pentamethyl-4-piperidyl)sebacate, 1,6,11-tris[(4,6-bis (N-butyl-N-(1,2,2,6,6-pentamethylpiperidin-4-yl)amino-1, 3,5-triazin-2-yl)amino]undecane, 1-[2-(3,5-di-t-butyl-4- hydroxyphenyl)propionyloxy]-2,2,6,6-tetromethylpiperidine, 8-benzyl-7,7,9,9-tetramethyl-3-octyl-1,3,8-triazaspiro[4,5]undecane-2,4-dione, 4-benzoyloxy-2,2,6,6-tetramethylpiperidine, and a N,N'-bis(3-aminopropyl)ethylenediamine-2,4-bis[N-butyl-N-(1,2,2,6,6-pentamethyl-4-piperidyl)amino]-6-chloro-1,3,5-triazine condensate.

Examples of the ultraviolet absorbing agent include benzophenone-based, benzotriazole-based, triazole-based, nickel-based, and salicyl-based ultraviolet absorbing agents. Examples of the ultraviolet absorbing agent include 2,2'-dihydroxy-4-methoxybenzophenone, 2-hydroxy-4-n-octoxybenzophenone, p-t-butylphenylsalicylate, 2,4-di-t-butylphenyl-3,5-di-t-butyl-4-hydroxy benzoate, 2-(2'-hydroxy-5'-methylphenyl)benzotriazole, 2-(2'-hydroxy-3',5'-di-t-amyl-phenyl)benzotriazole, 2-[2'-hydroxy-3',5'-bis(α,α-dimethylbenzylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2,5-bis[5'-t-butylbenzoxazolyl-(2)]-thiophene, bis(3,5-di-t-butyl-4-hydroxybenzylphosphoric acid monoethyl ester) nickel salt, a mixture of 2-ethoxy-5-t-butyl-2'-ethyloxalic acid-bis-anilide; 85~90% and 2-ethoxy-5-t-butyl-2'-ethyl-4'-t-butyloxalic acid-bis-anilide; 10~15%, 2-[2-hydroxy-3,5-bis(α,α-dimethylbenzyl)phenyl]-2H-benzotriazole, 2-ethoxy-2'-ethyloxalic acid bisanilide, 2-[2'-hydroxy-5'-methyl-3'-(3",4",5",6"-tetrahydrophthalimido-methyl)phenyl]benzotriazole, bis(5-benzoyl-4-hydroxy-2-methoxyphenyl) methane, 2-(2'-hydroxy-5'-t-octylphenyl)benzotriazole, 2-hydroxy-4-1-octoxybenzophenone, 2-hydroxy-4-dodecyloxybenzophenone, 2-hydroxy-4-octadecyloxybenzophenone, and phenyl salicylate.

And, it is preferable to mix a water-soluble thickener into the synthetic resin. The thickener is not particularly limited as far as it is water-soluble and has the viscosity increasing effect, but examples thereof include cellulose derivatives such as carboxymethylcellulose sodium, xanthan gum, carrageenan, cellulose, and hydroxyethylcellulose. It is preferable that a ratio of the thickener is adjusted at 30% by mass or less of an adhesion amount of the synthetic resin after drying. When the ratio is more than 30% by mass, since a tearing force is reduced, and air permeability is increased, this is not preferable.

It is preferable that, as a coating agent which is coated on the woven fabric, an aqueous dispersion containing water, the synthetic resin, and the water-soluble thickener is used. Upon this, an amount of the water-soluble thickener is adjusted so that a viscosity of the aqueous dispersion is in a range of 20 to 500 dPa·s (as measured with a B-type viscometer). A viscosity of the aqueous dispersion is more preferably 50 to 300 dPa·s.

By coating the aqueous dispersion with a viscosity adjusted in the range on one side of a synthetic resin woven fabric having FR (a ratio of an actual fiber volume occupied in a unit space) of 55% or more by knife coating, low air permeability which could not be attained previously can be obtained even when a resin is adhered to the woven fabric having a cover factor of less than 2000 at a small amount of 0.1 to 10 g/m².

The reason is thought as follows: The synthetic resin to be coated on the woven fabric is not present on a weaving yarn part or, if present, at an extremely small amount, and is selectively present on a border part between weaving yarn parts (a cross line part at which a warp and a weft are crossed). By the previous method, since a resin is present much also on a single yarn on a central cross section at a weaving yarn part, low air permeability than necessary is obtained, but there are demerit on the cost due to increase in a resin amount, and reduction in flexibility.

The existence state of such the resin coated film can be attained and, for example, can be attained by arbitrarily adjusting a cover factor of the woven fabric, and a viscosity and a coating amount of a coating agent to be coated as described below.

When a viscosity of the aqueous dispersion is smaller than 20 dPa·s, permeability of the aqueous dispersion into the woven fabric is increased, the aforementioned existence state of the specified resin is not obtained, and air permeability is increased. On the other hand, when a viscosity of the aqueous dispersion is more than 500 dPa·s, since the resin is adhered also to a part other than a necessary part, this is not preferable. Herein, when the water-soluble thickener having a high molecular weight is used, since a structural viscosity becomes great, reduction in a viscosity occurs frequently at shear generation at a coating step and, consequently, since the resin in permeated into a foundation cloth, a thickener having a low molecular weight is preferable. As the thickener, a thickener having a molecular weight of 100 dPa·s or lower in a 1 mass % aqueous solution is preferable. A contact pressure/tension at coating may be arbitrarily set so as to obtain the aforementioned resin coated film existence state.

In the present invention, it is necessary that air permeability of the fabric coated with the synthetic resin under a differential pressure of 100 kPa is 0.01 to 1.00 L/cm²/min. Since a force of 30 to 50 kPa is exerted at development of a normal airbag, but since there is further influence by heat due to an explosive of an inflator, it is suitable to discuss air permeability under a differential pressure of 100 kPa when the woven fabric is measured in the standard state. Air permeability is preferably 0.08 L/cm²/min or less, most preferably 0.50 L/cm²/min or less. When air permeability is more than 1.00 L/cm²/min, the human body initial constraining performance is inferior, being not preferable. When air permeability is less than 0.01 L/cm²/min, the initial constraining performance is satisfied, but a great difference between air permeability of this range is not seen and, additionally, a demerit in the cost and flexibility due to increase in a resin amount in order to reduce air permeability is generated, being not preferable. And, it is preferable that air permeability in JIS L 1096 is less than 0.1 cc/cm²/sec in the synthetic fiber woven fabric coated with the synthetic resin.

The fabric for an airbag of the present invention pursued necessary accommodability as an airbag and economy, and necessary air permeability was attained by adhesion of a small amount of the resin. In the previous method, in order to attain contradictory items of low air permeability, and accommodability and economy, either of a method of increasing a foundation cloth cover factor and decreasing a resin adhesion amount, or a method of decreasing foundation cloth cover factor and increasing a resin amount is performed. However, both methods can attain low air permeability, but need improvement in accommodability and economy.

The present inventors intensively studied the aforementioned points and, as a result, found that, by using a woven fabric satisfying a FR value of the equation 2 of 55% or more in a foundation cloth of a low cover factor of less than 2000, desired air permeability can be attained even when a resin amount is reduced. The FR value means a ratio of an actual fiber volume occupied in a unit space. The FR value needs to be 55% or more, and is preferably 57% or more, further preferably 60% or more.

When the FR value is 55% or more, even a combination of a low cover factor and a low resin amount can attain low air permeability which has previously been impossible. That is, even at the same fiber amount, by improving a ratio of an actual fiber volume occupied in a unit space, a great difference in air permeability before and after coating is not seen at a particularly low cover factor, but air permeability can be very effectively decreased by applying an extremely small amount of coating.

A process for manufacturing the fabric for an airbag of the present invention is not particularly limited as far as the FR value can be satisfied at a low cover factor. For example, examples include a method of improving filling property of a fiber by reducing residual shrinkage of a gray fabric in a hot water tank, a method of applying calendar processing to a finished woven fabric to forcibly improve a filling rate of a fiber, and a method of swelling a fiber with a chemical, and processing in a hot water tank is preferable from a viewpoint of the cost.

In the present invention, an adhesion amount of the synthetic resin is preferably 0.1 to 10 g/m$^2$, more preferably 1.0 to 8.0 g/m$^{2t}$ further preferably 1.0 to 4.0 g/m$^2$ in terms of a mass after drying. The mass after drying is obtained by subtracting a value of a mass of the woven fabric before coating measured according to JIS L1096 8.4.2 from a value of a mass of the woven fabric for an airbag after coating with the synthetic resin and drying measured according to JIS L1096 8.4.2. When the mass after drying is less than 0.1 g/hr, it becomes difficult to attain air permeability and, when the mass after drying is more than 10 g/m$^2$, flexibility is damaged, and the cost is increased. In the present invention, the woven fabric before coating means a woven fabric having finished steps other than coating of a resin just at a stage before coating of a resin and, usually, shrinkage treatment by heat treatment, an heat setting have been applied in many cases.

EXAMPLES

Then, the present invention will be explained in more detail by way of Examples. Various assessments in Examples were measured according to the following methods.
(Viscosity of Aqueous Dispersion)
A viscosity of an aqueous dispersion was measured using a viscometer (Viscotester VT-04F) manufactured by Rion Co., Ltd.
(Air Permeability)
Air permeability under a pressure of 100 kPa was measured using a high pressure air permeability measuring machine (manufactured by OEM System). For a base cloth before adhesion of a synthetic resin since air permeability is high, it was measured at 20 kPa.
(FR)
A woven fabric thickness T(mm) was measured under a pressure of 23.5 kPa according to JIS L 1096 8.5.1 and a woven fabric mass W(g/m$^2$) was measured according JIS L 1096 8.4.2. From these measured values and a fiber specific gravity ρ=1.14 (g/m$^3$), FR(%)=W/(ρ×T×10) was calculated.
(Accommodability)
Accommodability was measured according to ASTM D6478.

Example 1

A polyamide 66 fiber of a total fineness of 470 dtex, 72 filaments, and a boiling water shrinkage degree of 5.5% was woven in a water jet room in a plain weaving manner, shrinkage-processed with boiling water, and drying-finished at 110° C. to obtain a woven fabric having a warp density of 46/2.54 cm and a weft density of 46/2.54 cm. Using a polymer obtained by polymerizing a polyamide 6, a polyethylene glycol-propylamine adduct (number average molecular weight 600) and adipic acid at a molar ratio of 2.5:1:1, an aqueous resin dispersion having a solid matter concentration of 15% by mass was made. Then, to the aqueous dispersion was added carboxymethylcellulose (07326-95, manufactured by Nacalai Tesque) at 3% by mass relative to the aqueous resin, and a viscosity was adjusted to 230 dPa·s. An aqueous dispersion of this resin composition was coated on the woven fabric by knife coating, at a resin amount after drying of 3 g/cm$^2$. Properties of this woven fabric were assessed, and results are shown in Table 1.

Example 2

A polyamide 66 fiber of a total fineness of 350 dtex, 108 filaments, and a boiling water shrinkage degree of 8.5% was woven in a water jet room in a plain weaving manner, shrinkage-processed with boiling water, and drying-finished at 110° C. to obtain a woven fabric having a warp density of 53/2.54 cm and a weft density of 53/2.54 cm. Using a polymer obtained by polymerizing a polyamide 6, a polyethylene glycol-propylamine adduct (number average molecular weight 1000) and adipic acid at a molar ratio of 2.0:1:1, an aqueous resin dispersion having a solid matter concentration of 10% by mass was made. Then, to the aqueous dispersion was added carboxymethylcellulose (07326-95, manufactured by Nacalai Tesque) at 2% by mass relative to the aqueous resin, and a viscosity was adjusted to 120 dPa·s. An aqueous dispersion of this resin composition was coated on the woven fabric by knife coating, at a resin amount after drying of 4 g/cm$^2$. Properties of this woven fabric were assessed, and results are shown in Table 1.

Example 3

A polyamide 66 fiber of a total fineness of 470 dtex, 72 filaments, and a boiling water shrinkage degree of 5.5% was woven in a water jet room in a plain weaving manner, shrinkage-processed with boiling water, and drying-finished at 110° C. to obtain a woven fabric having a warp density of 43/2.54 cm and a weft density of 43/2.54 cm. Using a polymer obtained by polymerizing a polyamide 6, adipic acid, and polyethylene glycol (number average molecular weight 600) at a molar ratio of 1.8:1:1, an aqueous resin dispersion having a solid matter concentration of 6% by mass was made. Then, to the aqueous dispersion was added carboxymethylcellulose (07326-95, manufactured by Nacalai Tesque) at 2% by mass relative to the aqueous resin, and a viscosity was adjusted to 105 dPa·s. An aqueous dispersion of this resin composition was coated on the woven fabric by knife coating, at a resin amount after drying of 8 g/cm$^2$.
Properties of this woven fabric were assessed, and results are shown in Table 1.

Example 4

According to the same manner as that of Example 1 except that a boiling water shrinkage degree of the polyamide 66 fiber was 9.0%, a woven fabric coated with a resin was manufactured, properties of the woven fabric were assessed, and results are shown in Table 1.

Example 5

A polyamide 66 fiber of a total fineness of 470 dtex, 72 filaments, and a boiling water shrinkage degree of 6.0% was woven in a water jet room in a plain weaving manner, shrinkage-processed with boiling water, and drying-finished at 110° C. to obtain a woven fabric having a warp density of 46/2.54 cm and a weft density of 46/2.54 cm.

Separately, a reactor of a volume of about 5 L equipped with a stirrer, a temperature controller, a manometer, a nitrogen gas inlet, a condensation water outlet, and a pressure regulator was charged with 1005.45 g of polyether diamine (JEFFAMINE ED900, manufactured by HUNTSMAN, total amine: 2.16 meq/g), 158.68 g of adipic acid (AA), 375.00 g of ε-caprolactam (ε-CL), and 22.5 mL of an aqueous phosphoric acid solution (63.2 g/L), the interior of the container was sufficiently replaced with nitrogen, a temperature was raised to 230° C. over 0.5 hour, and polymerization was performed at 230° C. for 4.0 hours. Thereafter, polymerization was performed for 1.5 hours under reduced pressure, subsequently, a pressure in the container was reduced with a pressure regulating device over 1.0 hour and, further, polymerization was performed at 230° C. for 0.5 hour to obtain a polymer.

Using the resulting polymer, an aqueous resin dispersion having a solid matter concentration of 15% by mass was prepared. Then, to the aqueous dispersion was added carboxylmethylcellulose (07326-95, manufactured by Nacalai Tesque) at 3% by mass relative to the aqueous resin to adjust a viscosity to 230 dPa·s. An aqueous dispersion of this resin composition was coated on one side of the woven fabric used in Example 1 by knife coating, to a resin amount after drying of 5 g/m². Properties of this woven fabric were assessed, and results are shown in Table 1.

Comparative Example 1

A polyamide 66 fiber of a total fineness of 350 dtex, 108 filaments, and a boiling water shrinkage degree of 9.0% was woven into a fabric in a water jet room in a plain weaving manner, shrinkage-processed with boiling water, and drying-finished at 110° C. to obtain a woven fabric having a warp density of 64/2.54 cm and a weft density of 61/2.54 cm. Using a polymer obtained by polymerizing a polyamide 6, a polytetramethylene glycol-propylamine additive (number average molecular weight 1000) and adipic acid at a molar ratio of 2.0:1:1, an aqueous resin dispersion having a solid matter of 10% by mass was prepared. Then, to the aqueous dispersion was added carboxymethylcellulose (07326-95, manufactured by Nacalai Tesque) at 1% by mass relative to the aqueous resin to adjust a viscosity to 15 dPa·s. An aqueous dispersion of this resin composition was coated on the woven fabric by knife coating, to a resin amount after drying of 2 g/m². Properties of this woven fabric were assessed, and results are shown in Table 1.

Comparative Example 2

A polyamide 66 fiber of a total fineness of 470 dtex, 72 filaments, and a boiling water shrinkage degree of 5.5% was woven into a fabric in a water jet room in a plain weaving manner, and drying-finished at 110° C. to obtain a woven fabric having a warp density of 46/2.54 cm and a weft density of 46/2.54 cm. Using a polymer obtained by polymerizing a polyamide 6, a polyethylene glycol-propylamine additive (number average molecular weight 600) and adipic acid at a molar ratio of 2.5:1:1, an aqueous resin dispersion having a solid matter of 15% by mass was prepared. Then, to the aqueous dispersion was added carboxymethylcellulose (07326-95, manufactured by Nacalai Tesque) at 3% by mass relative to the aqueous resin to adjust a viscosity to 230 dPa·s. An aqueous dispersion of this resin composition was coated on the woven fabric by knife coating, to a resin amount after drying of 3 g/m². Properties of this woven fabric were assessed, and results are shown in Table 1.

TABLE 1

| | Unit | Example 1 | Example 2 | Example 3 | Example 4 | Example 5 | Comparative Example 1 | Comparative Example 2 |
|---|---|---|---|---|---|---|---|---|
| Total fineness | dtex | 470 | 350 | 470 | 470 | 470 | 350 | 470 |
| Filament number | Number | 72 | 108 | 72 | 72 | 72 | 108 | 72 |
| Density Warp | Number/inch | 46 | 55 | 43 | 46 | 46 | 64 | 46 |
| Weft | Number/inch | 46 | 55 | 43 | 46 | 46 | 61 | 46 |
| Cover factor | — | 1892 | 1952 | 1769 | 1892 | 1892 | 2219 | 1892 |
| Base fabric air permeability | L/cm²/min | 3 | 1.3 | 4.6 | 1.5 | 3 | 0.7 | 3.3 |
| Resin amount | g/m² | 3 | 4 | 8 | 3 | 3 | 2 | 3 |
| Air permeability | L/cm²/min | 0.48 | 0.24 | 0.42 | 0.38 | 0.26 | 0.35 | 1.15 |
| Accommodability | cm³ | 1780 | 1490 | 1750 | 1790 | 1780 | 1920 | 1770 |
| FR | % | 57 | 59 | 55 | 61 | 57 | 61 | 52 |

In Examples 1 to 5, by increasing a FR value with a cover factor of less than 2000, it is possible to attain low air permeability even at a low resin amount. Particularly, when Examples 1 and 5 are compared in which only a kind of the resin to be adhered to the woven fabric is different, it is seen that air permeability is considerably reduced even at a small adhesion amount of the resin although a foundation cloth having a low cover factor is used in Example 5. On the other hand, in Comparative Example 1, air permeability can be attained, but accommodability is deteriorated due to a high cover factor. In addition, in Comparative Example 2, since a FR value is low even at a cover factor of less than 2000, low air permeability can not be attained at a low resin amount.

As apparent from results of Examples 1 to 5, and Comparative Examples 1 and 2, the present invention can provide a woven fabric for an airbag which is of the low cost, is excellent in accommodability, and has air permeability satisfying the human body initial constraining performance as compared with the previous fabric for an airbag, can be provided.

INDUSTRIAL APPLICABILITY

Since the fabric for an airbag of the present invention is of the low cost, is excellent in accommodability, and has air permeability satisfying the human body initial constraining performance, it can be utilized for an airbag which is one of automobile safety devices, and considerably contributes to the industrial field.

What is claimed is:

1. A fabric for an airbag comprising a synthetic fiber woven fabric in which at least one side thereof is coated with a synthetic resin, wherein a range of 0.1 to 10 g/m² of the synthetic resin is adhered to the synthetic fiber woven fabric having a cover factor represented by equation 1 of less than 2000 and FR represented by equation 2 of 55% or more, and air permeability of the fabric under a pressure difference of 100 kPa after adhesion is 0.01 to 1.00 L/cm²/min, wherein the synthetic resin is a polyamide-based resin having a soft segment comprising a polyol having a number average molecular weight of 100 to 5000, $$\text{Cover factor} = \left[\frac{\text{warp density (number/2.54 cm)} \times}{\sqrt{\text{(warp fineness } (dtex) \times 0.9)}}\right] + \left[\frac{\text{weft density (number/2.54 cm)} \times}{\sqrt{\text{(weft fineness } (dtex) \times 0.9)}}\right] \quad \text{(equation 1)}$$

$$FR(\%) = W/(\rho \times T \times 10) \quad \text{(equation 2)}$$

W: woven fabric mass (g/cm²), ρ: fiber specific gravity:(g/cm³), T: woven fabric thickness (mm).

2. The fabric for an airbag according to claim 1, wherein the synthetic resin comprises at least a thermoplastic elastomer and two kinds of thickeners, and a ratio of the thickener among an adhesion amount of the synthetic resin in the fabric after drying is 30% by mass or less.

3. The fabric for an airbag according to claim 2, wherein the thermoplastic elastomer is a polyamide-based elastomer.

4. The fabric for an airbag according to claim 3, wherein the polyamide-based elastomer is a polyether polyamide copolymer composed of a soft segment and a hard segment, the soft segment consists of polyether polyamide composed of a polyether diamine compound represented by the following general formula (I) and a dicarboxylic acid compound represented by the following general formula (II), and the hard segment consists of a polyamide composed of an aminocarboxylic acid compound represented by the following general formula (III), and/or a lactam compound represented by the following general formula (IV)

[Chemical formula 1]

(I)

[wherein R represents a straight or branched alkylene group of a carbon number of 2 to 3, and n represents a numerical value of 13 to 26]

[Chemical formula 2]

HOOC—R¹—COOH (II)

[wherein $R^1$ represents a tethering group comprising a hydrocarbon chain]

[Chemical formula 3]

H₂N—R²—COOH (III)

[wherein $R^2$ represents a tethering group comprising a hydrocarbon chain]

[Chemical formula 4]

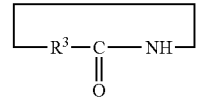
(IV)

[wherein $R^3$ represents a tethering group comprising a hydrocarbon chain].

5. The fabric for an airbag according to claim 2, wherein the thickener is a cellulose-based derivative.

6. The fabric for an airbag according to claim 1 wherein the polyol is an amino-based polyol.

7. The fabric for an airbag according to claim 1 wherein the synthetic resin has a soft segment comprising a polyol having a number average molecular weight of 300 to 3000.

* * * * *